(12) United States Patent
Yuzawa et al.

(10) Patent No.: US 10,701,223 B2
(45) Date of Patent: Jun. 30, 2020

(54) IMAGE FORMING APPARATUS

(71) Applicant: CANON KABUSHIKI KAISHA, Tokyo (JP)

(72) Inventors: Atsuyuki Yuzawa, Yokohama (JP); Ryuji Hamasaki, Tokyo (JP); Tetsuji Suzuki, Fujisawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/251,676

(22) Filed: Jan. 18, 2019

(65) Prior Publication Data

US 2019/0230237 A1 Jul. 25, 2019

(30) Foreign Application Priority Data

Jan. 24, 2018 (JP) .................................. 2018-010092
Jan. 10, 2019 (JP) .................................. 2019-002946

(51) Int. Cl.
*H04N 1/00* (2006.01)

(52) U.S. Cl.
CPC ..... *H04N 1/00496* (2013.01); *H04N 1/00384* (2013.01); *H04N 1/00397* (2013.01); *H04N 1/00408* (2013.01); *H04N 1/00551* (2013.01)

(58) Field of Classification Search
CPC ........... H04N 1/00496; H04N 1/00384; H04N 1/00397; H04N 1/00551
See application file for complete search history.

(56) References Cited

U.S. PATENT DOCUMENTS

| 6,078,765 A * | 6/2000 | Takano | H04N 1/00543 399/107 |
| 2003/0184824 A1* | 10/2003 | Chida | H04N 1/00912 358/502 |
| 2004/0149487 A1* | 8/2004 | Yamamoto | H04N 1/00519 174/135 |
| 2008/0225347 A1* | 9/2008 | Hwang | H04N 1/00246 358/474 |
| 2010/0014127 A1* | 1/2010 | Osakabe | H04N 1/00519 358/497 |

* cited by examiner

*Primary Examiner* — Ted W Barnes
(74) *Attorney, Agent, or Firm* — Venable LLP

(57) ABSTRACT

An image forming apparatus includes an apparatus body having a cartridge accommodation portion, an opening/closing member attached to the apparatus body and being movable between a first position at which the cartridge accommodation portion is exposed to the outside of the image forming apparatus and a second position at which the opening/closing member covers the cartridge accommodation portion and an operation panel unit for operating the image forming apparatus. The operation panel unit has a sheet portion and a switch portion to transmit a user's operation to the image forming apparatus via the sheet portion. The sheet portion is provided in the opening/closing member and is disposed at such a position as to at least partially overlap the cartridge accommodation portion on an insertion/removal trajectory of the cartridge and to cover the switch portion provided in the apparatus body in a state in which the opening/closing member is at the second position.

20 Claims, 14 Drawing Sheets

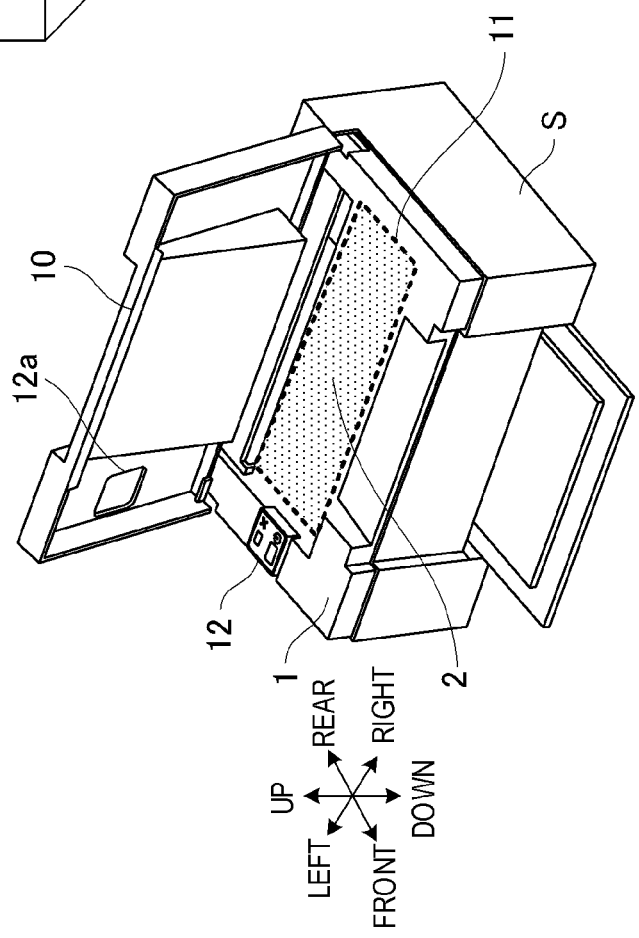
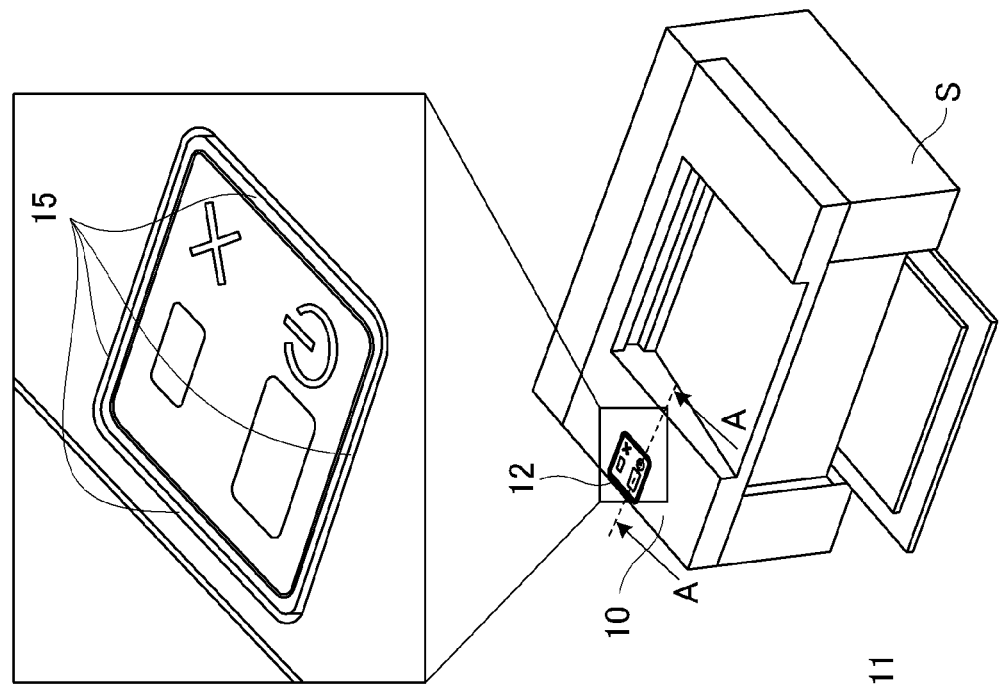
FIG.1A
FIG.1B

PERSPECTIVE VIEW OF E-E CROSS-SECTION

PERSPECTIVE VIEW OF E-E CROSS-SECTION
(OPERATING PORTION ONLY IS ILLUSTRATED)

IMAGE FORMING APPARATUS

BACKGROUND OF THE INVENTION

Field of the Invention

The present invention relates to a configuration of an operation panel unit of an image forming apparatus such as a copying machine, a printer, or a facsimile machine.

Description of the Related Art

In recent years, the size of an image forming apparatus such as a printer or a facsimile machine has been decreasing, and there is an increasing demand for usability and design. From the viewpoint of usability, an operation panel unit of an apparatus body is often disposed in an upper part of a front surface of an image forming apparatus. However, in a compact monochrome page printer illustrated in FIGS. 1A and 1B, for example, a cartridge accommodation portion 11 for accommodating a cartridge 2 is provided inside the apparatus body of an image forming apparatus S as illustrated in FIG. 1A. A cartridge door 10 as an opening/closing member that opens and closes to expose the cartridge accommodation portion 11 to the outside of the apparatus or conceal the cartridge accommodation portion 11 from the outside is provided in an upper part of the front side of the image forming apparatus S. In this manner, the cartridge is also taken out of the upper part of the front side of the image forming apparatus in order to realize front access which improves the usability. Furthermore, the operation panel unit 12 is disposed on the outer side in a left-right direction of the cartridge accommodation portion 11 of a housing 1 of the image forming apparatus S.

SUMMARY OF THE INVENTION

In the image forming apparatus illustrated in FIGS. 1A and 1B, when the operation panel unit 12 is disposed in an area on the outer side of the cartridge accommodation portion 11 in the above-described manner, the larger the operation panel unit 12, the larger becomes the size of the image forming apparatus S in the width direction.

When the operation panel unit 12 is disposed to overlap the cartridge accommodation portion 11 in the width direction of the image forming apparatus S, an insertion/removal trajectory of the cartridge 2 overlaps the operation panel unit 12 and the cartridge 2 is not removed. Therefore, it is not possible to dispose the operation panel unit 12 so as to overlap the cartridge accommodation portion 11 in the width direction of the image forming apparatus S, and it is difficult to reduce the size of the image forming apparatus S.

An object of the present invention is to reduce the size of the image forming apparatus S while maintaining the usability of the operation panel unit 12 of the image forming apparatus S.

In order to attain the object, an image forming apparatus according to the present invention includes:

an apparatus body having a cartridge accommodation portion capable of accommodating a cartridge used for forming an image;

an opening/closing member attached to the apparatus body and being movable between a first position at which the cartridge accommodation portion is exposed to the outside of the image forming apparatus and a second position at which the opening/closing member covers the cartridge accommodation portion; and an operation panel unit for operating the image forming apparatus, the operation panel unit including:

a sheet portion; and a switch portion having a switch substrate that transmits a user's operation to the image forming apparatus via the sheet portion, wherein the sheet portion is provided in the opening/closing member, wherein the switch portion is provided in the apparatus body, and wherein, in a state in which the opening/closing member is at the second position, the sheet portion is at such a position as to at least partially overlap the cartridge accommodation portion on an insertion/removal trajectory of the cartridge and cover the switch portion.

In order to attain the object, an image forming apparatus according to the present invention includes:

an apparatus body having a cartridge accommodation portion capable of accommodating a cartridge used for forming an image;

an opening/closing member attached to the apparatus body and being movable between a first position at which the cartridge accommodation portion is exposed to the outside of the image forming apparatus and a second position at which the opening/closing member covers the cartridge accommodation portion; and an operation panel unit for operating the image forming apparatus, the operation panel unit including:

a user interface portion operated by a user; and a switch portion having a switch substrate that transmits a user's operation to the image forming apparatus via the user interface portion, wherein the user interface portion is provided in the opening/closing member, wherein the switch portion is provided in the apparatus body, and wherein, in a state in which the opening/closing member is at the second position, the user interface portion is at such a position as to at least partially overlap the cartridge accommodation portion on an insertion/removal trajectory of the cartridge and cover the switch portion.

In order to attain the object, an image forming apparatus according to the present invention includes:

an apparatus body having a guide for guiding a cartridge used for forming an image to an inner side of the apparatus body in order to accommodate the cartridge;

an opening/closing member attached to the apparatus body and being movable between a first position at which the inner side of the apparatus body is exposed to the outside and a second position at which the opening/closing member covers the inner side of the apparatus body; and an operation panel unit for operating the image forming apparatus, the operation panel unit including:

a user interface portion operated by a user; and a switch portion having a switch substrate that transmits a user's operation to the image forming apparatus via the user interface portion, wherein the user interface portion is provided in the opening/closing member, wherein the switch portion is provided in the apparatus body, and wherein, when seen in a direction of pressing the switch portion in a state in which the opening/closing member is at the second position, the user interface portion is at such a position as to at least partially overlap the guide and cover the switch portion.

According to the present invention, it is possible to reduce the size of the image forming apparatus S while maintaining the usability of the operation panel unit 12 of the image forming apparatus S.

Further features of the present invention will become apparent from the following description of exemplary embodiments with reference to the attached drawings.

BRIEF DESCRIPTION OF THE DRAWINGS

FIGS. 1A and 1B are perspective views of an image forming apparatus S when a cartridge door is open and closed as a comparative example;

DESCRIPTION OF THE EMBODIMENTS

Hereinafter, a description will be given, with reference to the drawings, of embodiments (examples) of the present invention. However, the sizes, materials, shapes, their relative arrangements, or the like of constituents described in the embodiments may be appropriately changed according to the configurations, various conditions, or the like of apparatuses to which the invention is applied. Therefore, the sizes, materials, shapes, their relative arrangements, or the like of the constituents described in the embodiments do not intend to limit the scope of the invention to the following embodiments.

Embodiment 1

An image forming apparatus to which the present invention is applied is an apparatus that forms an image on a recording medium and includes a printer, a copying machine, a facsimile machine, or the like which uses an electrophotographic system.

Figure 14:
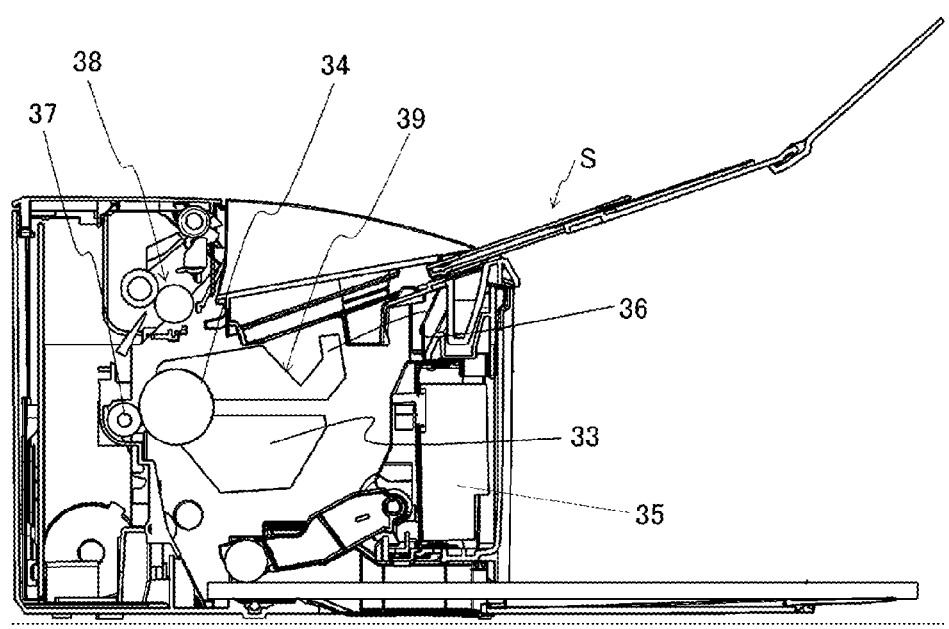
FIG. 14 is a cross-sectional view of an image forming apparatus according to the present invention.

FIG. 14 is a cross-sectional view illustrating an entire configuration of an image forming apparatus S according to the present invention.

An image forming process which uses an electrophotographic system is performed in the following manner, for example. First, the surface of a photosensitive member 34 as an image bearing member is uniformly charged to a predetermined polarity by a charging device. After that, a latent image is formed on the photosensitive member 34 by an exposure device 35 such as a laser on the basis of image data of an image formed on the recording medium.

When a developing device 33 causes toner as a developer to adhere to the latent image formed on the photosensitive member 34, this latent image is developed as a toner image to become a visible image.

The toner image formed on the photosensitive member 34 is conveyed up to a transfer nip formed by a transfer roller 37 and the photosensitive member 34. Moreover, a recording medium accommodated in the image forming apparatus is transported up to the transfer nip. A high voltage of a polarity opposite to the normal charging polarity of toner is applied at the transfer nip whereby the toner image on the photosensitive member 34 is transferred to the recording medium.

Finally, the recording medium having the toner image transferred thereto is transported up to a fixing device 38 which is an image heating device and is heated and pressurized, whereby the toner image is fixed to the recording medium. With the above-described processes, an image is formed on the recording medium.

Since some extraneous matters such as toner having different polarities remain on the photosensitive member after the toner image is transferred thereto, the extraneous matters on the surface of the photosensitive member after passing through the transfer nip are removed by a cleaning device 39 or the like. After that, the image forming apparatus waits in preparation for a next image forming process.

The image forming apparatus S of the present embodiment includes a process cartridge in which the photosensitive member 34, the charging device, the developing device 33, the cleaning device 39, and a handle 36 are integrated. The process cartridge is detachably attached to an apparatus body including the housing of the image forming apparatus. A configuration in which the above-mentioned components are integrated as a cartridge is not limited to the above-described configuration. Examples of the integrated configuration include a drum cartridge in which a drum which is a photosensitive member and the cleaning device are integrated, a developing cartridge in which a developing device such as a developing roller and a developer storage are integrated, and a toner cartridge in which a developer storage can be detached separately.

Description of Configuration

A configuration of the present embodiment will be described with reference to FIGS. 3A and 3B, FIGS. 6A and 6B, and FIG. 7.

Figure 7:
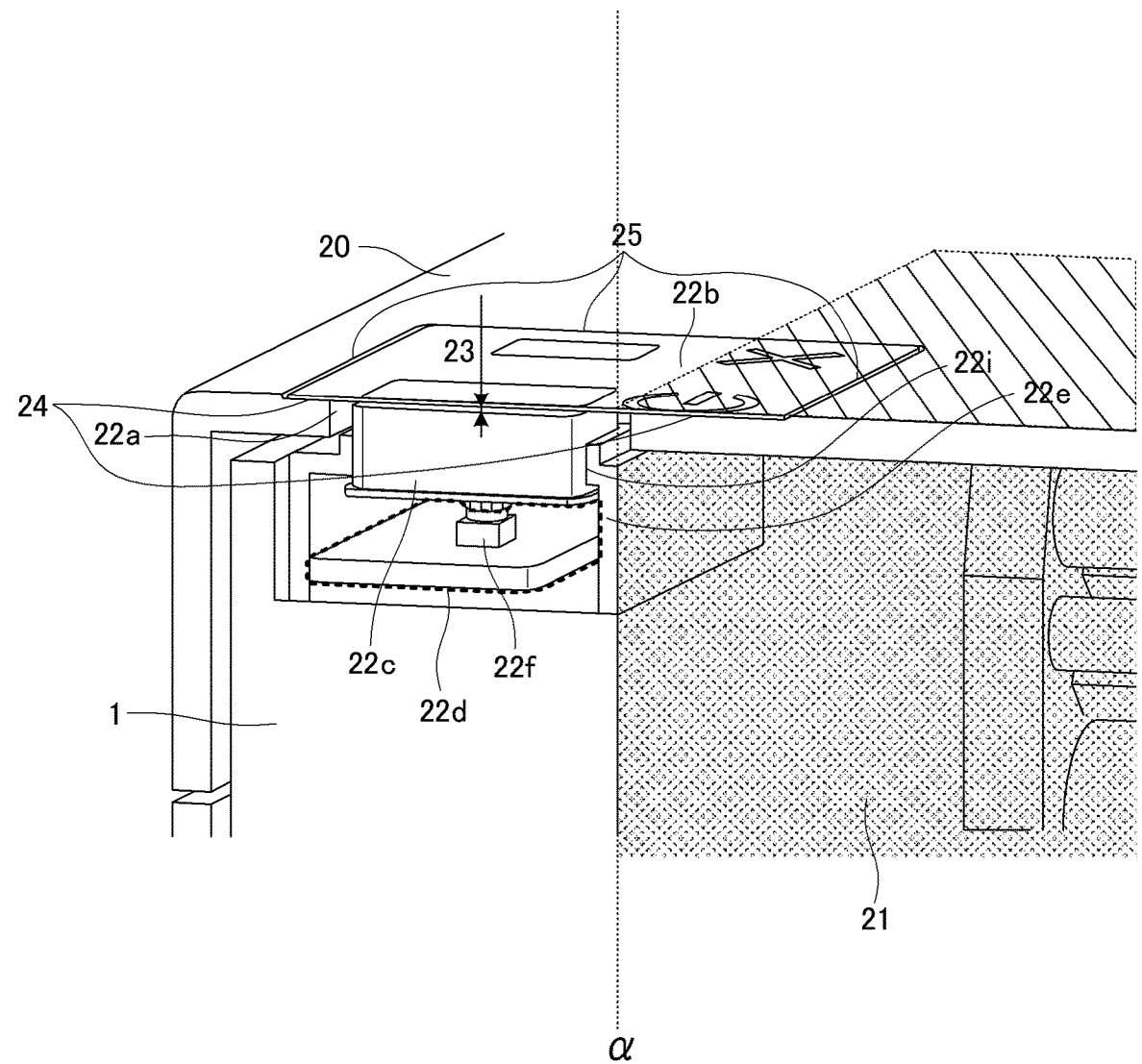
FIG. 7 is an enlarged perspective view of a B-B cross-section in FIG. 6B of the operation panel unit according to Embodiment 1.

FIG. 6A is a perspective view illustrating a state in which a cartridge door 20 as an opening/closing member of the image forming apparatus S according to the present embodiment is open, FIG. 6B is a perspective view illustrating a state in which the cartridge door 20 is closed, and FIG. 7 illustrates a B-B cross-section on FIG. 6B of an operation panel unit 22.

As illustrated in FIGS. 6A and 6B, in a configuration of the present embodiment, the cartridge door 20 as an opening/closing member capable of pivoting about a pivot center 26 is provided on a front surface side of an upper part of the image forming apparatus S. The cartridge door 20 is held in the housing 1 so as to be movable between a first position (FIG. 6A) and a second position (FIG. 6B). Here, the first position is a position at which a cartridge accommodation portion 21 which is a space capable of accommodating such a cartridge as illustrated in a dotted portion surrounded by a dot line in FIG. 6A is exposed to the outside of the image forming apparatus S. Here, the portion surrounded by a dot line in FIG. 6A is an opening of the cartridge accommodation portion 21 and the cartridge accommodation portion 21 has a structure depressed further toward the bottom surface of the apparatus. That is, the housing forms the cartridge accommodation portion 21, and the cartridge accommodation portion 21 includes an opening of the housing and a concave portion and is configured to be capable of accommodating a cartridge. The cartridge passes through the opening and is attached into the concave portion. When the cartridge door 20 is closed, the position of the cartridge in the cartridge accommodation portion 21 is determined, and an image forming operation can be performed. The second position is a position at which the cartridge accommodation portion 21 is concealed from the outside of the image forming apparatus S.

Figure 3B:
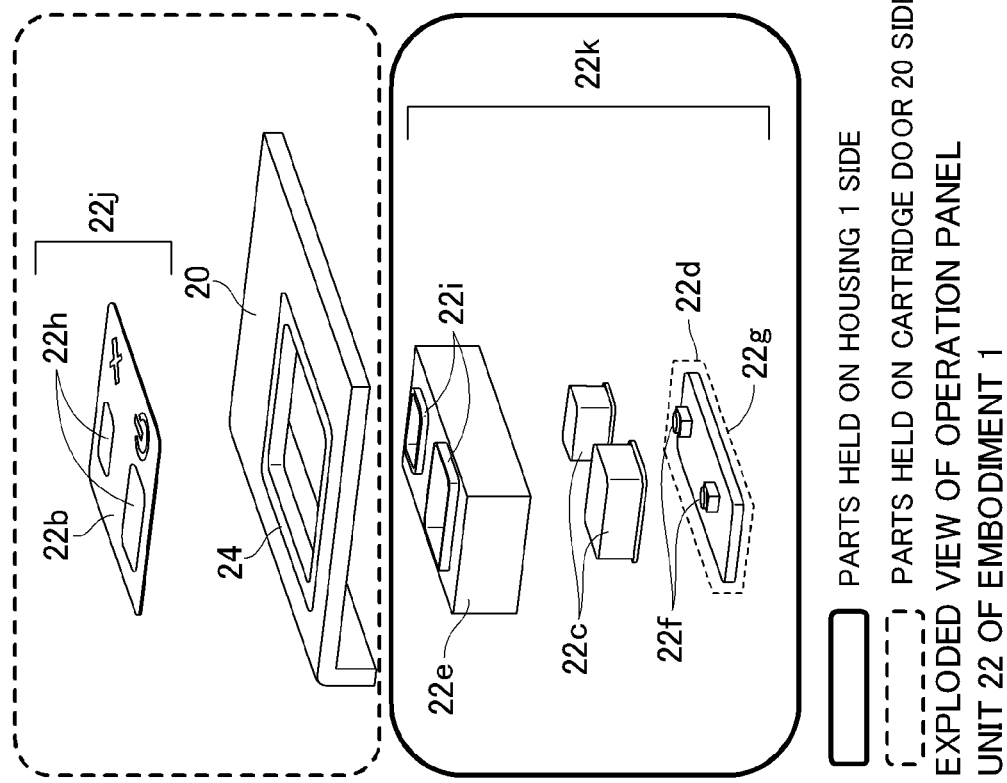
FIGS. 3A and 3B are exploded views of an operation panel unit according to a comparative example and Embodiment 1.

As illustrated in FIG. 3B, the operation panel unit 22 includes a user interface portion 22$j$ and a switch portion 22$k$. In the present embodiment, a sheet portion 22$b$ formed of a sheet member including a button frame 22$h$ corresponds to the user interface portion 22$j$. A plurality of members including buttons such as a button member 22$c$, a switch unit 22$d$ (here, the switch unit 22$d$ indicates a combination of a switch 22$f$ and a switch substrate 22$g$ illustrated in FIG. 3B), and a holder member 22$e$ corresponds to the switch portion 22$k$. In the present embodiment, the user interface portion 22$j$ is disposed on the cartridge door 20, and the switch portion 22$k$ is disposed on the housing 1. That is, the user interface portion 22$j$ is attached to a sheet member attachment area 24 of the cartridge door 20. The switch portion 22$k$ is disposed on the outer side of a cartridge insertion/removal area of the cartridge accommodation portion 21 provided in an apparatus body of the image forming apparatus S and is fixed to the housing 1 by a holding member (not illustrated).

Next, a configuration on the side of the cartridge door 20 and the configuration on the side of the housing 1 of the operation panel unit 22 according to the present embodiment will be described.

Configuration on Cartridge Door 20 of Operation Panel Unit 22

First, the configuration on the cartridge door 20 of the operation panel unit 22 will be described with reference to FIGS. 3A and 3B to FIG. 7.

An opening 22$a$ is formed in the cartridge door 20 (see FIG. 7) so that the switch portion 22$k$ and the cartridge door 20 do not interfere with each other when the cartridge door 20 is at the second position (at which the cartridge door 20 is closed) illustrated in FIG. 6B.

Furthermore, a sheet member attachment area 24 for attaching the sheet portion 22$b$ is provided around the opening 22$a$ of the cartridge door 20 at a position which is one step lower than the circumference of the opening 22$a$. The sheet member attachment area 24 is a depth such that the sheet portion 22$b$ does not protrude from the cartridge door 20 when the sheet portion 22$b$ is attached to the cartridge door 20.

The sheet member attachment area 24 has an area capable of securing a peeling strength such that the sheet member attachment area 24 does not peel off even when a user applies a maximum operating force of operating the sheet portion 22$b$. The peeling strength is measured when the sheet portion 22$b$ is attached to the sheet member attachment area 24 by a double-sided tape or an adhesive.

Figure 4:
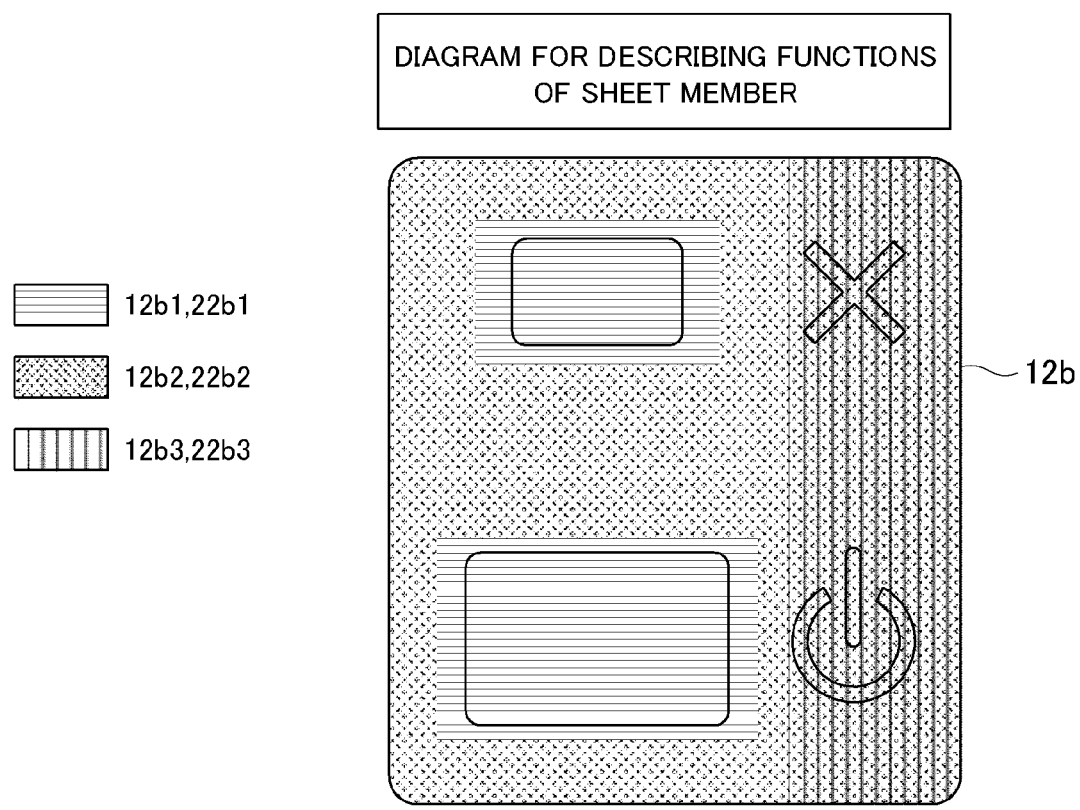
FIG. 4 is a diagram illustrating functions of respective portions of a sheet portion of a comparative example and Embodiment 1.

Here, the size of the sheet portion 22$b$ of the present embodiment and the functions of the respective portions will be described with reference to FIGS. 4 and 5. The sheet portion 22$b$ includes a sheet deforming region 22$b$1, a pasting region 22$b$2, and an icon region 22$b$3.

Figure 5:
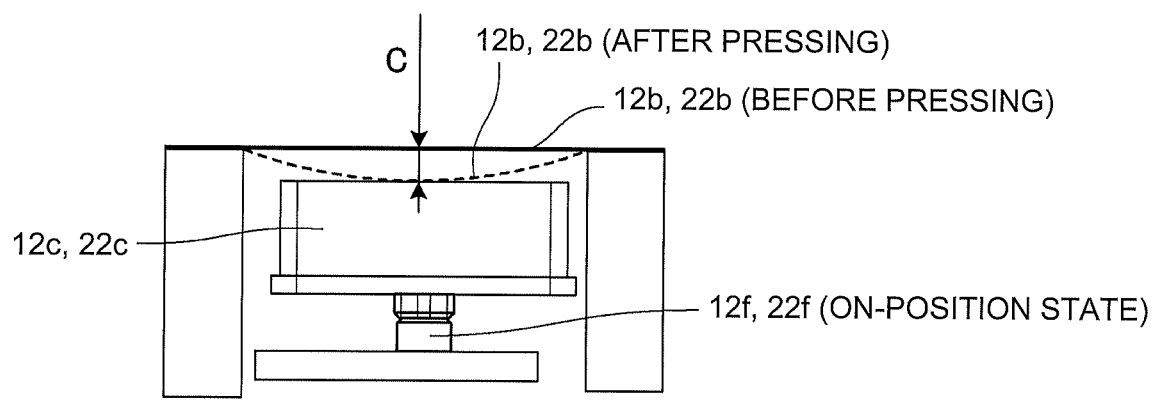
FIG. 5 is a schematic diagram illustrating the state before and after a sheet portion is deformed.
Figure 6:
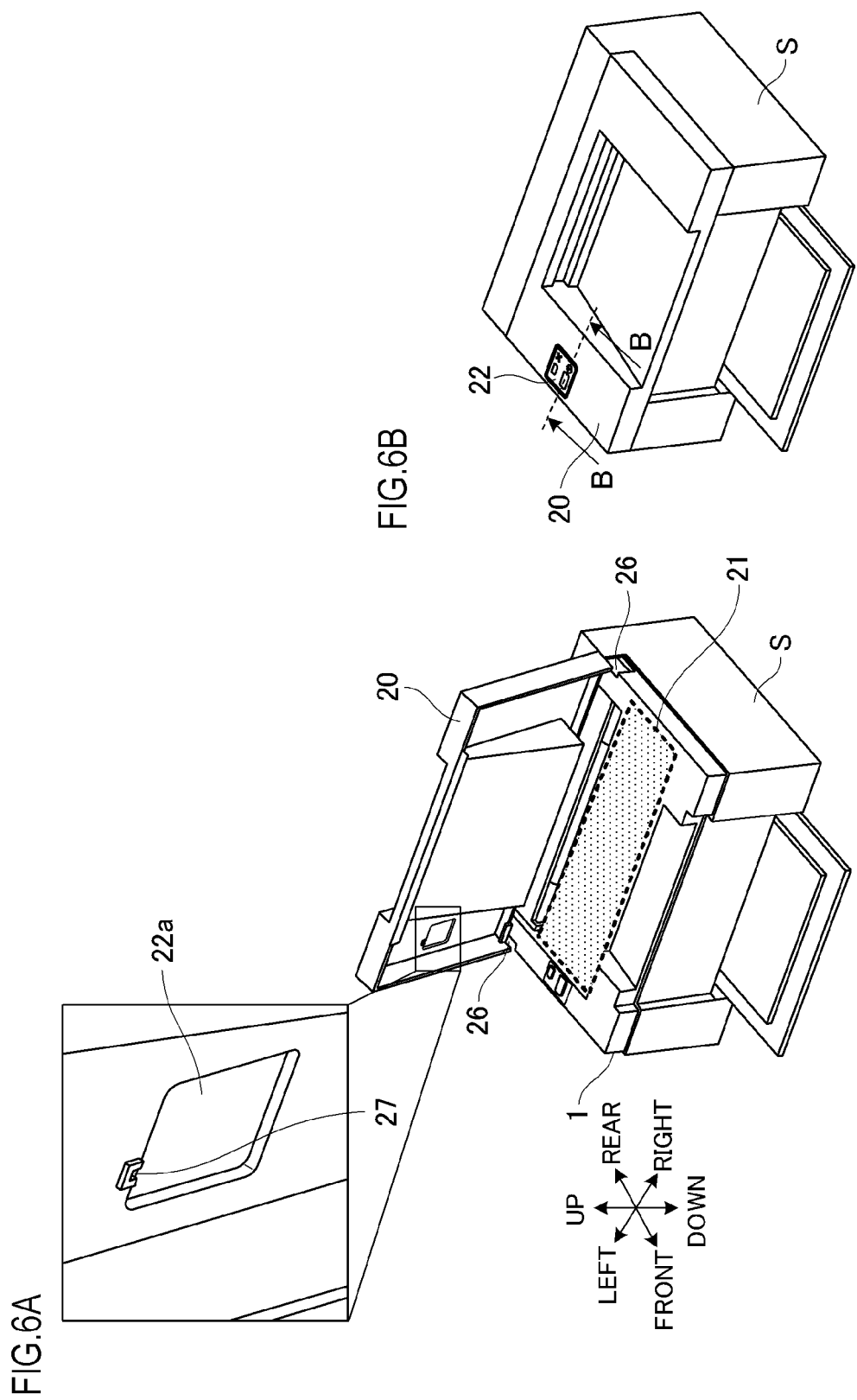
FIGS. 6A and 6B are perspective views of an image forming apparatus S of Embodiment 1 when a cartridge door is open and closed.

As illustrated in FIG. 5, the sheet deforming region 22$b$1 is a region necessary for the sheet portion 22$b$ to be deformed by a necessary distance C (the sum of a clearance 23 and a moving distance from an OFF position to an ON position of the switch 22$f$).

Moreover, the pasting region 22$b$2 is a region necessary for securing a peeling strength such that the sheet portion 22$b$ does not peel off the holder member 22$e$ when the sheet portion 22$b$ is pressed by an operation of a user.

Furthermore, the icon region 22$b$3 is a region in which an icon as a display portion indicating a button of the operation panel unit 22 and an operation thereof to be executed by the image forming apparatus S is disposed. Therefore, when respective buttons are arranged in a depth direction of the image forming apparatus S as illustrated in FIG. 4, a user can easily understand the functions of buttons immediately when the icon region 22$b$3 is disposed at a position adjacent to the side of each button (that is, a portion that covers a button portion of the switch portion 22$k$ to be described later). Moreover, the size of an icon is preferably large from the viewpoint of usability. The sheet portion 22$b$ needs to be deformed by the necessary distance C (see FIG. 5) so that the switch 22$f$ is turned on. Therefore, as a sheet member that forms the sheet portion 22$b$, a plastic sheet having a thickness of 0.3 mm or smaller (for example, polycarbonate or polyethylene terephthalate) is preferably used.

The dimension in a front-rear direction and a left-right direction of the image forming apparatus S of the sheet member attachment area 24 may be larger by approximately 0.3 mm than the dimensions in the front-rear direction and the left-right direction of the image forming apparatus S of the sheet portion 22$b$ by taking variations of components into consideration. Therefore, a gap 25 between the sheet portion 22$b$ and the sheet member attachment area 24 can be suppressed to 0.6 mm or smaller.

Configuration of Switch Portion 22$k$

Next, a configuration of the switch portion 22$k$ attached to the housing 1 of the operation panel unit 22 will be described with reference to FIGS. 3A and 3B, FIGS. 6A and 6B, and FIG. 7.

As described above, the switch portion 22$k$ includes the button member 22$c$, the switch unit 22$d$, and the holder member 22$e$. A dimensional relation between the button member 12$c$ and the button member 22$c$ is the same as the dimensional relation between the switch unit 12$d$ and the switch unit 22$d$. Here, the switch unit 22$d$ indicates a combination of the switch substrate 22$g$ and the switch 22$f$ as a switch portion pressed by the button member 22$c$ illustrated in FIG. 3B. As illustrated in FIG. 7, the holder member 22$e$ for holding the switch portion 22$k$ at a predetermined position of the housing 1 fixes the switch unit 22$d$ to the inner side of the holder member 22$e$ using a fixing member (not illustrated). Furthermore, the button member 22$c$ as a button portion of the switch portion 22$k$ that can slide up and down so as to be moved away from and closer to the switch 22f is disposed on the switch 22f on the switch unit 22d. The button member 22c is held in the holder member 22e so as to protrude toward the outer side of the holder member 22e from a button member opening 22i formed in the holder member 22e.

Positional Relation Between User Interface Portion 22j and Switch Portion 22k when Cartridge Door 20 is Closed Next, a positional relation between the user interface portion 22j and the switch portion 22k when the cartridge door 20 as an opening/closing member is at the second position (at which the cartridge door 20 is closed) (that is, when the operation panel unit 22 is in an operable state) will be described with reference to FIG. 7.

In the configuration of the present embodiment, in a state in which the cartridge door 20 is at the second position (at which the cartridge door 20 is closed), the button member 22c is under the opening 22a formed in the cartridge door 20 as illustrated in FIG. 7. The button frame 22h of the sheet portion 22b is disposed to overlap an upper portion of the button member 22c corresponding to the button portion of the switch portion 22k. The clearance 23 for causing the sheet portion 22b to prevent the switch 22f from maintaining the ON state in a state in which the sheet portion 22b is not operated is provided between the sheet portion 22b and the button member 22c. Furthermore, a protrusion 27 for maintaining a constant distance between the cartridge door 20 and the holder member 22e is formed on the cartridge door 20 (see FIGS. 6A and 6B).

Operation Method of Operation Panel Unit 22

The button frames 22h corresponding to respective operations are printed on the sheet portion 22b, and a user presses on the button frame 22h corresponding to a selection operation in a downward direction of the image forming apparatus S. By doing so, the sheet portion 22b is deformed in the pressing direction as illustrated in FIG. 5 to make contact with the button member 22c of the switch portion 22k positioned under the sheet portion 22b. Furthermore, when the user presses the sheet portion 22b further, the button member 22c presses the switch 22f and the switch 22f enters into the ON state, whereby an operation selected by the user is executed by the image forming apparatus S. That is, the switch portion 22k disposed under the sheet portion 22b transmits the user's operation to the image forming apparatus S via the sheet portion 22b which is the user interface portion 22j.

Description of Advantage of Reduction in Size of Image Forming Apparatus S

According to Embodiment 1

Next, advantages of reduction in the size of the image forming apparatus S according to the present embodiment will be described by comparing the sizes in the width direction of the image forming apparatuses S of a comparative example and the present embodiment with reference to FIGS. 1A and 1B to FIGS. 3A and 3B, FIGS. 6A and 6B, and FIGS. 8A and 8B.

Figure 2:
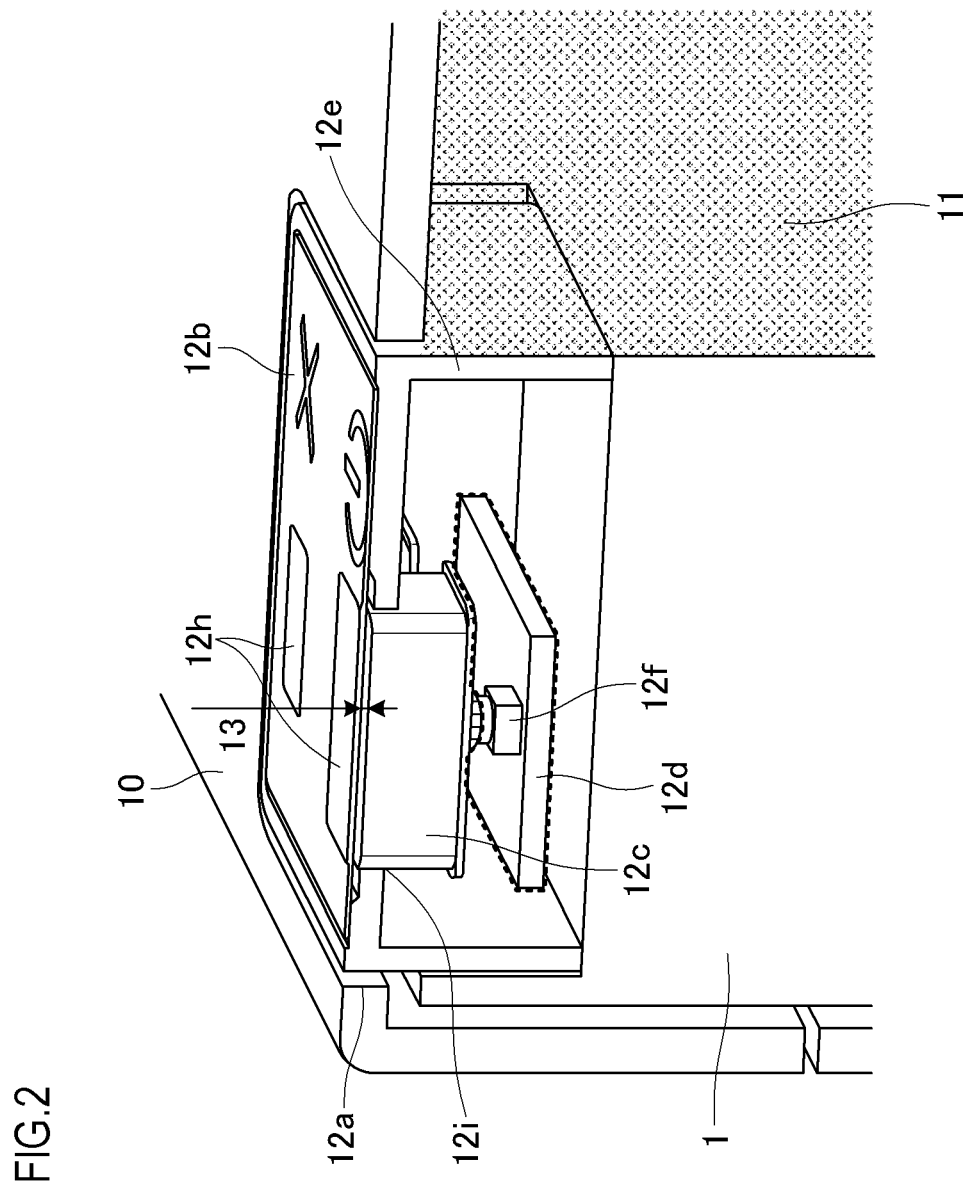
FIG. 2 is an enlarged perspective view of an A-A cross-section in FIG. 1B of an operation panel unit as a comparative example.
Figure 3A:
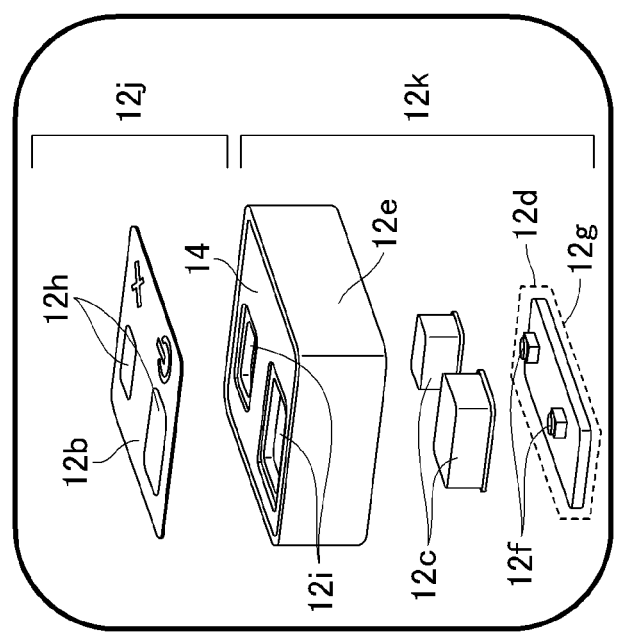

First, an operation panel unit when the user interface portion 12j and the switch portion 12k are integrated will be described as a comparative example. FIG. 2 illustrates a perspective view of the A-A cross-section in FIG. 1B of the operation panel unit 12, and FIGS. 3A and 3B illustrate exploded views of the operation panel units 12 and 22 of the comparative example and Embodiment 1. FIG. 4 illustrates a diagram for describing the functions of respective portions of the sheet portions 12b and 22b of a comparative example and Embodiment 1, and FIG. 5 illustrates a schematic diagram before and after the sheet portion 12b is deformed.

The operation panel unit 12 of the comparative example includes a user interface portion 12j and a switch portion 12k as illustrated in FIG. 3A. Similarly to the present embodiment, the sheet portion 12b corresponds to the user interface portion 12j, and a configuration including the button member 12c, the switch unit 12d, and the holder member 12e corresponds to the switch portion 12k.

The sheet portion 12b is attached to the sheet member attachment area 14 provided in the holder member 12e, and the switch unit 12d is fixed to the inner side of the holder member 12e by a fixing member (not illustrated). Moreover, the button member 12c is provided between the switch unit 12d and the sheet portion 12b. The button member 12c is held by a holder member 12e so as to be slidable in an up-down direction in a state of protruding from a button member opening 12i which is one step lowered from the sheet member attachment area 14.

In a state in which the respective components are attached to the holder member 12e in the above-described manner and a pressing force is not applied to the sheet portion 12b, a clearance 13 for causing the sheet portion 12b to prevent the switch 12f from maintaining the ON state is provided between the sheet portion 12b and the button member 12c.

Here, in the comparative example, as will be described later, the user interface portion 12j and the switch portion 12k are integrated and are held on the side of the housing 1. As illustrated in FIGS. 1A and 1B and FIG. 2, an opening 12a is formed in the cartridge door 10 so that the user can operate the operation panel unit 12 when the cartridge door 10 is in a second state (a closed state).

A material of the sheet portion 12b and a method of operating the operation panel unit 12 are similar to those of Embodiment 1, and the redundant description thereof will be omitted.

Figure 8:
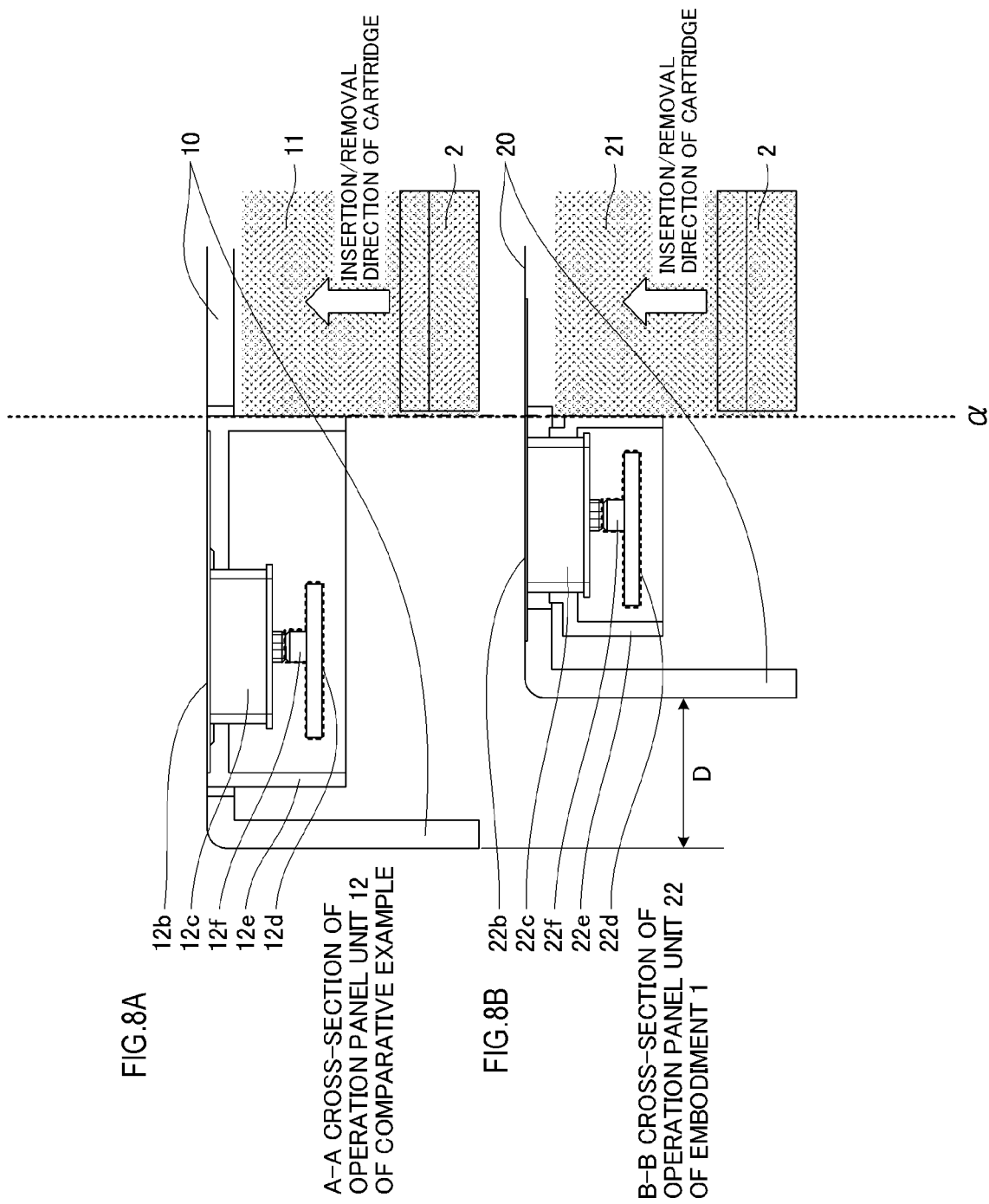
FIGS. 8A and 8B are comparative diagrams illustrating the width of the operation panel unit of a comparative example and an image forming apparatus S of Embodiment 1.

Here, FIGS. 8A and 8B illustrate cross-sectional views of the operation panel unit of the image forming apparatus S when the comparative example and the present embodiment are used. FIG. 8A illustrates the A-A cross-section in FIG. 1B, and FIG. 8B illustrates the B-B cross-section in FIG. 6B.

In the comparative example, it was difficult to reduce the size of the operation panel unit 12 from the viewpoint of visibility and operability as usability and the peeling strength of the sheet portion 12b from the holder member 12e. As illustrated in FIG. 2 and FIG. 3A, since the sheet portion 12b is attached directly to the sheet member attachment area 14 of the holder member 12e, it was not possible to reduce the size of the holder member 12e to be smaller than the sheet portion 12b. As a result, the size of the operation panel unit 12 increases. When the operation panel unit 12 is disposed in an area on the outer side of the cartridge accommodation area, the larger the size of the operation panel unit 12, the larger becomes the size of the image forming apparatus S in the width direction.

As understood from FIGS. 8A and 8B, since the cartridge accommodation portion 11 also serves as an insertion/removal area of the cartridge 2, it was not possible to dispose the operation panel unit 12 so as to overlap the cartridge accommodation portion 11 in the width direction of the image forming apparatus S and to reduce the size of the image forming apparatus S due to a layout.

As illustrated in FIGS. 1A and 1B and FIG. 2, the operation panel unit 12 of the comparative example has the user interface portion 12j and the switch portion 12k which are integrated and held in the housing 1. Due to this, the opening 12a is formed in the cartridge door 10 so that the user can operate the cartridge door 10 even when the cartridge door 10 is closed. Moreover, since the cartridge door 10 and the operation panel unit 12 are separate members, the opening 12a needs to be larger by approximately 1 mm to 2 mm than the operation panel unit 12 so that the operation panel unit 12 does not interfere with the cartridge door 10 when the cartridge door 10 rotates.

Therefore, as illustrated in FIG. 1B, when the cartridge door 10 is at the second position (the closing position), a gap 15 is formed between the cartridge door 10 and the operation panel unit 12. This gap 15 forms a shadow and a brightness difference occurs between the gap 15 and the surrounding thereof. Moreover, the design performance deteriorates since unevenness of the gap 15 is not maintained due to accuracy reasons in manufacturing processes.

However, in the present embodiment, as described above, first, the sheet portion 22b of the user interface portion 22j is attached to the sheet member attachment area 24 of the cartridge door 20. The switch portion 22k is attached to the side of the housing 1 and the switch portion 22k and the sheet portion 22b are separated from each other. As a result, it is possible to reduce the size of the switch portion 22k to be smaller than the sheet portion 22b. In other words, the area of the sheet portion 22b is larger than the area of the switch portion 22k when the sheet portion 22b is projected in a direction in which the button portion of the switch portion 22k is pressed, and the sheet portion 22b is attached to the cartridge door 20 which is an opening/closing member.

Figure 9:
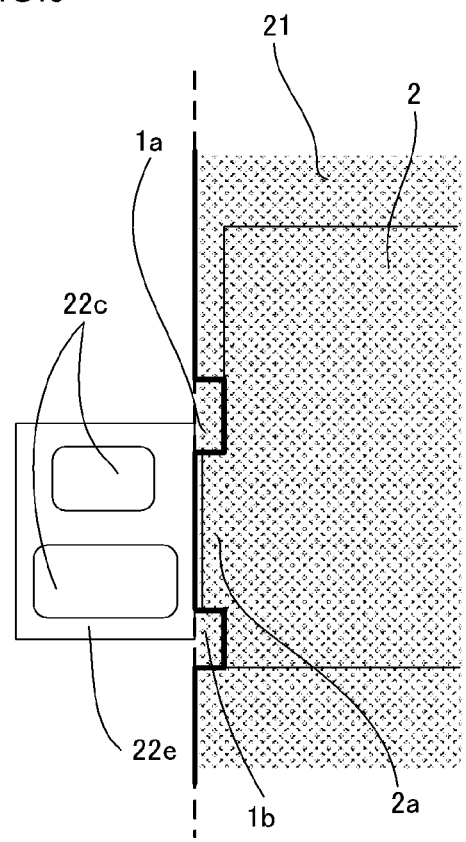
FIG. 9 is an enlarged view of a portion near an end of a cartridge according to Embodiment 1.

By doing so, when the cartridge door 20 is closed (that is, when the cartridge door 20 is at the second position), the user interface portion 22j is disposed at such a position as to cover the switch portion 22k as illustrated in FIG. 7. In this case, the user interface portion 22j extends toward the cartridge accommodation portion 21, and a portion of the sheet member overlaps an insertion/removal trajectory of the cartridge as illustrated in FIG. 7 and FIGS. 8A and 8B. FIG. 9 illustrates an enlarged view of a portion near one end of the cartridge 2 when the cartridge door 20 is open (that is, when the cartridge door 20 is at the first position), and when seen from an insertion/removal direction of the cartridge. As illustrated in FIG. 9, a portion of a wall surface facing the cartridge accommodation portion 21 on the side where the switch portion 22k among wall surfaces of the housing 1 protrudes as an upper guide 1a and a lower guide 1b. On the other hand, a protruding portion 2a that protrudes toward a wall surface on the side where the switch portion 22k is provided is formed on the cartridge 2. When the cartridge 2 is attached to or detached from the image forming apparatus S, the upper guide 1a and the lower guide 1b serve as a guiding portion, and the cartridge 2 is guided toward the cartridge accommodation portion 21 or the outside of the apparatus in a state in which the protruding portion 2a is received between the two guides. Since the upper guide 1a and the lower guide 1b protrude toward the cartridge accommodation portion 21 as described above, when the cartridge door 20 is closed, the user interface portion 22j also overlaps partially the upper and lower guides 1a and 1b. A similar guiding portion is provided in the housing where the switch portion 22k is not present so that the cartridge 2 is guided toward the cartridge accommodation portion 21 or the outside of the apparatus. Here, the insertion/removal trajectory of the cartridge is a trajectory in the insertion direction and the removal direction of the cartridge on the side close to the cartridge accommodation portion 21 using a dot line α in FIG. 7 and FIGS. 8A and 8B as a boundary line. In FIG. 7, a diagonal line portion on the upper surface forms a portion of the insertion/removal trajectory of the cartridge. That is, in FIG. 7, a region that the diagonal line portion on the upper surface moves in an up-down direction corresponds to an insertion/removal trajectory. On the other hand, when the cartridge 2 is inserted into the image forming apparatus S or is removed from the image forming apparatus S, the user interface portion 22j retracts from the insertion/removal trajectory of the cartridge 2 together with the cartridge door 20 (see FIG. 6A). Due to this, the user interface portion 22j and the cartridge accommodation portion 21 can be disposed at a position where they overlap each other in the width direction of the image forming apparatus S in a state in which the cartridge door 20 is closed. In other words, the user interface portion 22j and the cartridge accommodation portion 21 can be disposed so as to overlap on the insertion/removal trajectory of the cartridge 2 in a state in which the cartridge door 20 is closed.

From the above, when the size of the holder member 22e is reduced, the operation panel unit 22 can be moved toward the center of the image forming apparatus S by the width of the icon region 22b3 serving as a display portion. As a result, the width of the image forming apparatus S can be reduced by the distance D.

As described above, according to the configuration of the present embodiment, the user interface portion 22j and the switch portion 22k of the operation panel unit 22 are disposed separately on the side close to the cartridge door 20 and the side close to the housing 1. As a result, it is possible to reduce the size in the width direction of the image forming apparatus S while satisfying the usability of the operation panel unit 22. Moreover, since the sheet portion 22b as the user interface portion 22j covers the opening 22a of the cartridge door 20, the gap between the cartridge door and the operation panel unit which occurs in the comparative example is substantially not visible. As a result, it is possible to reduce the size of the image forming apparatus S and to provide a compact image forming apparatus having excellent design performance and which prevents a large gap resulting from unevenness between the cartridge door and the operation panel unit.

Embodiment 2

In Embodiment 1, a flexible sheet member is used for the user interface portion 22j attached to the cartridge door 20 of the operation panel unit 22 to form the sheet portion 22b. In Embodiment 2, an example in which a plastic member (that is, a rigid member) having larger thickness and higher rigidity than the sheet member is used for a user interface portion 32j will be described. The switch portion 22k of the present embodiment is the same as that of Embodiment 1, and the redundant description thereof will be omitted.

Figure 10:
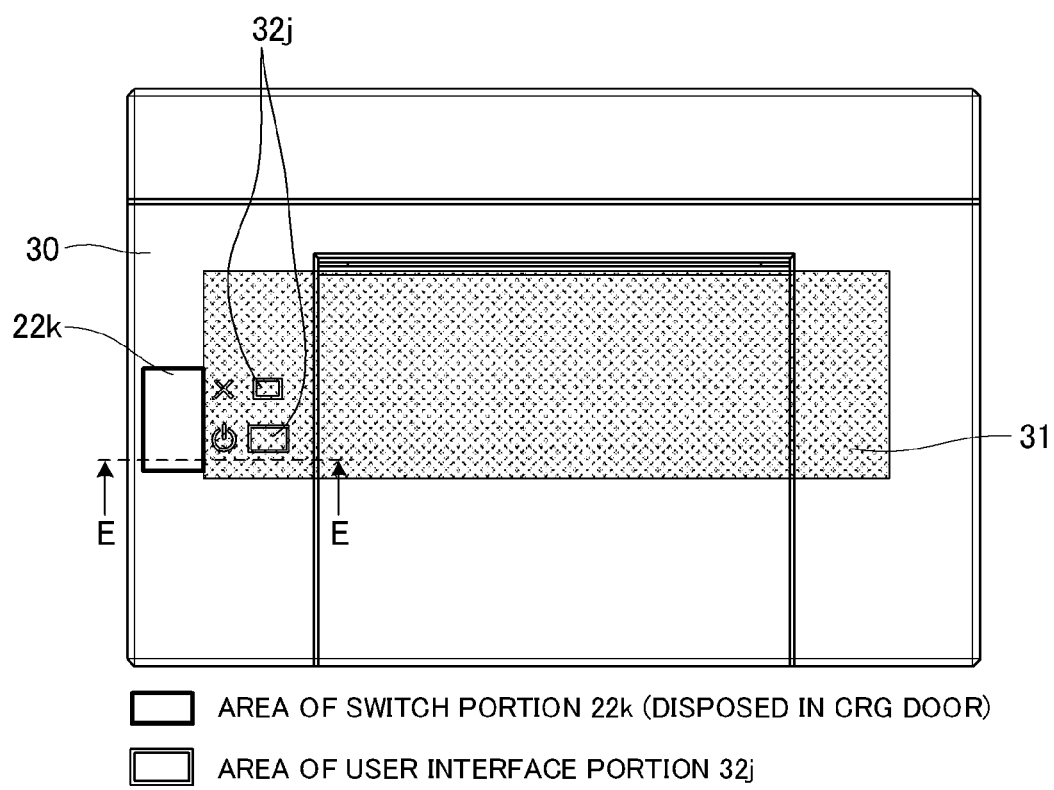
FIG. 10 is a top view of an image forming apparatus S according to Embodiment 2.

When the configuration of the present embodiment is used, by using a rigid plastic member for the user interface portion 32j, it is possible to realize an operation panel unit compatible with design of a higher degree of freedom. As a result, as illustrated in FIG. 10, the user interface portion 32j can be disposed at a position shifted in the width direction of the image forming apparatus S with respect to the switch portion 22k.

Figure 11:
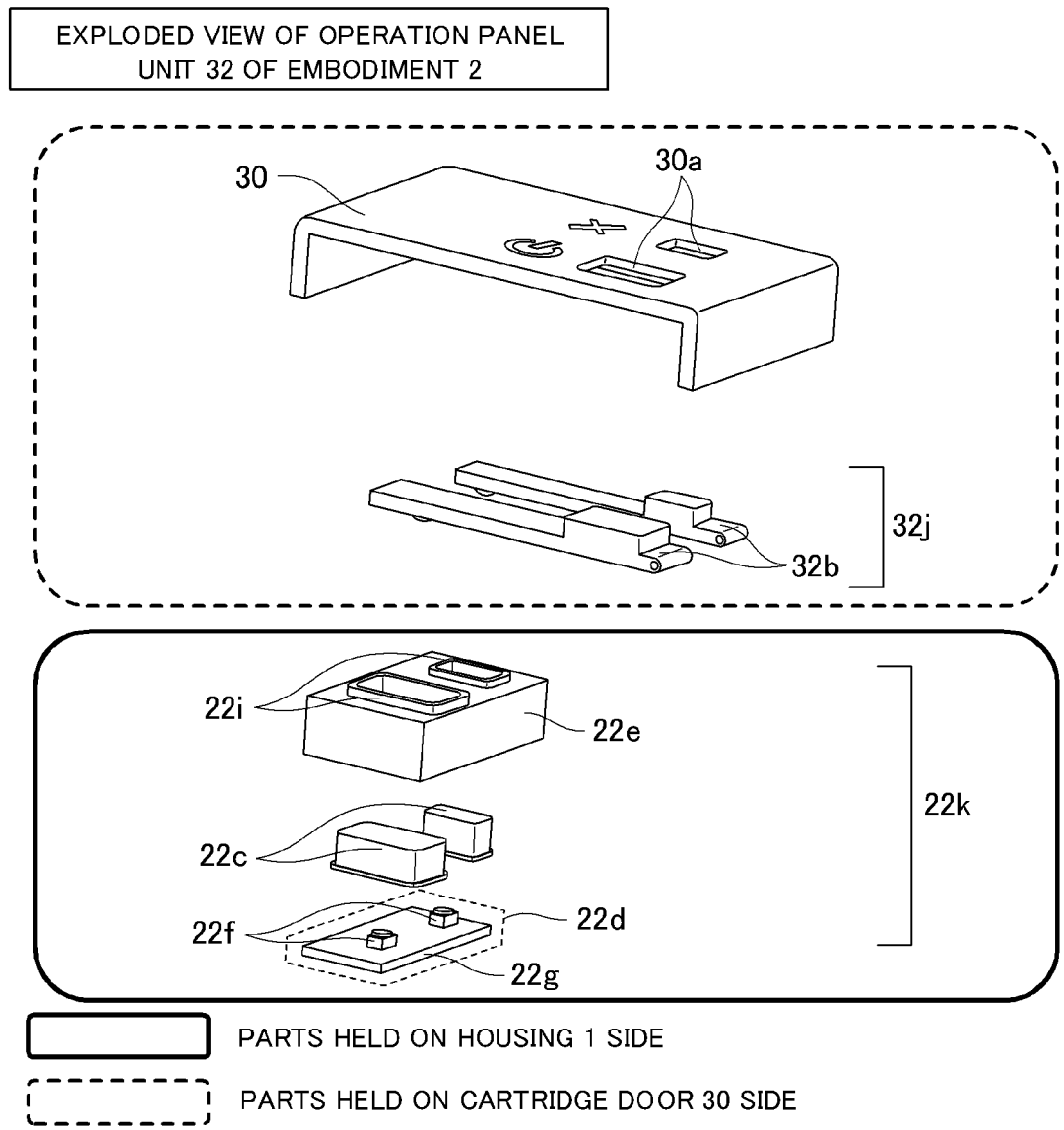
FIG. 11 is an exploded view of an operation panel unit according to Embodiment 2.

In the present embodiment, as illustrated in FIG. 11 (an exploded view of the operation panel unit 32 of Embodiment 2), the operation panel unit 32 includes the user interface portion 32j and the switch portion 22k similarly to Embodiment 1. Moreover, the user interface portion 32j is disposed on the side close to the cartridge door 30 which is an opening/closing member and the switch portion 22k is disposed on the side close to the housing 1.

Configuration on Cartridge Door 30 of Operation Panel Unit 32

Figure 12A:
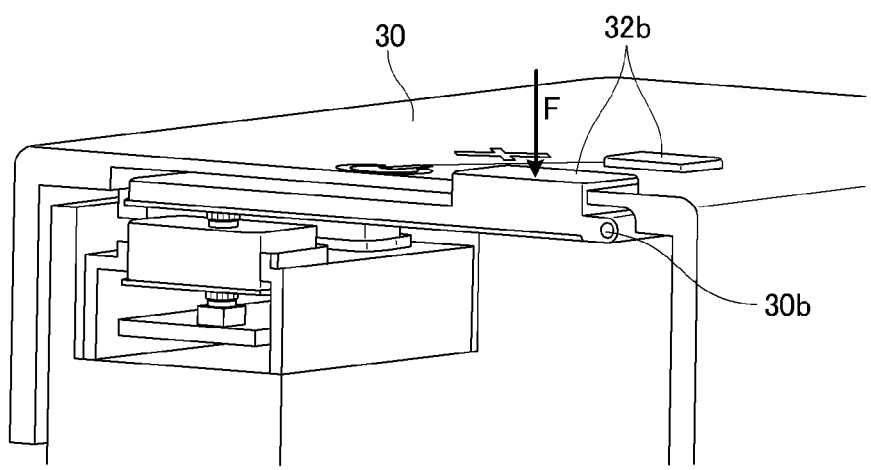
FIGS. 12A and 12B are perspective views of an E-E cross-section in FIG. 10 of Embodiment 2.
Figure 12B:
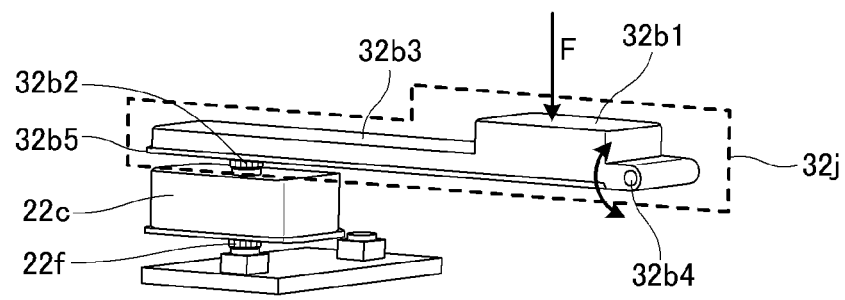
Figure 13:
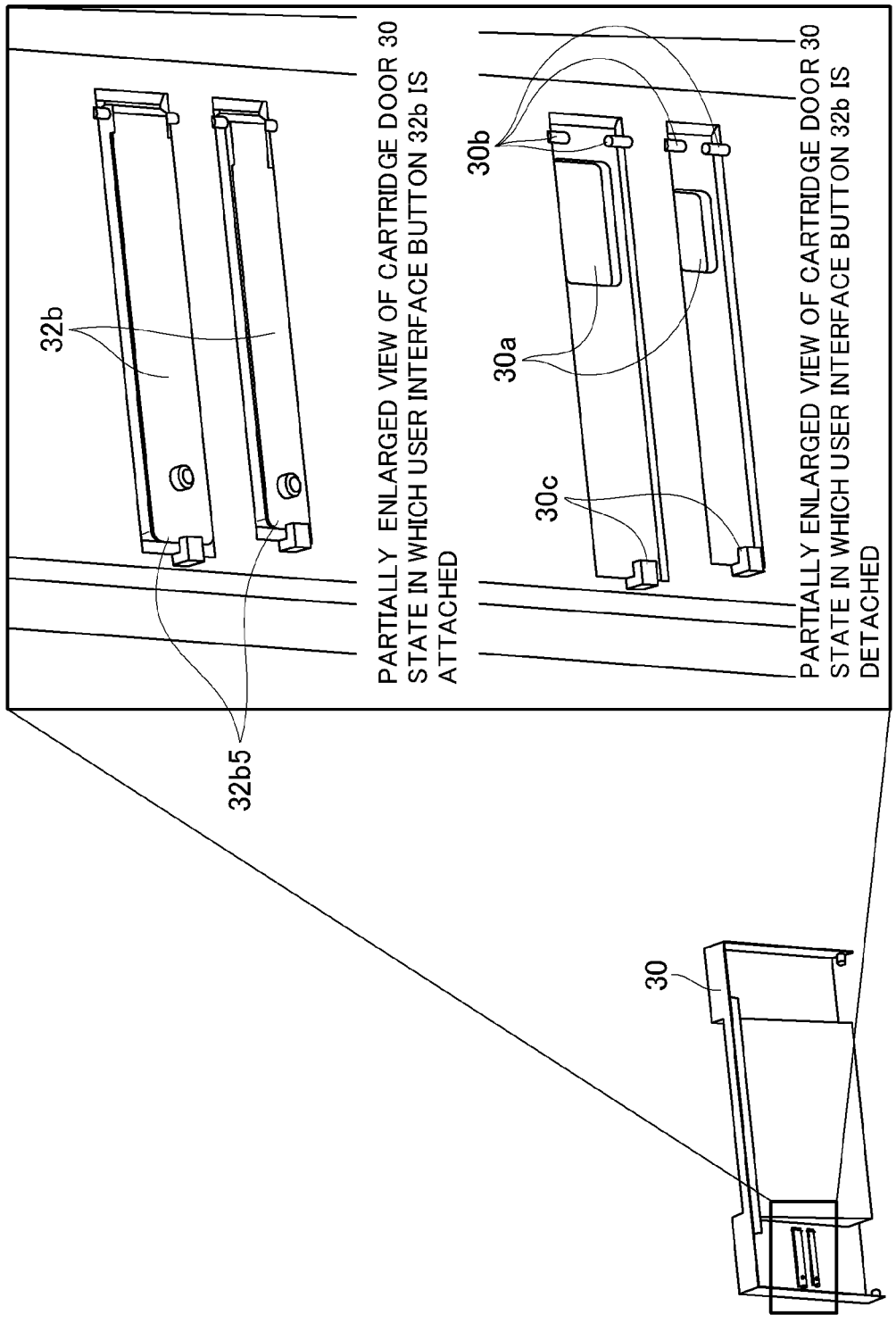
FIG. 13 is an enlarged perspective view of a back surface of a cartridge door.

Next, a configuration on the side close to the cartridge door 30 of the present embodiment will be described with reference to FIGS. 10 to 13. FIG. 10 illustrates a top view when the cartridge door 30 of the present embodiment is at the second position (the closed state), and FIG. 11 illustrates an exploded view of the operation panel unit 32 of the present embodiment. FIGS. 12A and 12B illustrate an E-E cross-section in FIG. 10, illustrating the user interface portion 32j and the switch portion 22k of the present embodiment. FIG. 13 illustrates an enlarged perspective view when the user interface portion 32j of the cartridge door 30 is seen from the back side.

In a configuration in which a flexible sheet member is used for the user interface portion 22j similarly to Embodiment 1, the sheet portion 22b is deformed so that the button portion of the switch portion 22k is pressed by the sheet portion 22b. That is, the button frame 22h of the user interface portion 22j needs to be disposed immediately above the switch portion 22k. Therefore, as illustrated in FIGS. 10 and 11, there is a limitation on design that the entire user interface portion 32j cannot be disposed to be shifted from the switch portion 22k.

In the present embodiment, a rigid plastic member illustrated in FIGS. 12A and 12B is used for the user interface portion 32j to form a user interface button 32b. By doing so, as illustrated in FIG. 10, the operation panel unit 32 in which the user interface portion 32j and the switch portion 22k are shifted in the width direction of the image forming apparatus S is realized.

Configuration of User Interface Portion 32j

Next, a configuration of the user interface portion 32j of the present embodiment will be described with reference to FIGS. 12A and 12B and FIG. 13.

As illustrated in FIGS. 12A and 12B, the user interface button 32b includes a user operating portion 32b1 and a button pressing portion 32b2. The user operating portion 32b1 is disposed to protrude from an opening 30a formed in the cartridge door 30 on the cartridge accommodation portion 31 so that the user can press the user operating portion 32b1. On the other hand, the button pressing portion 32b2 is disposed above the button member 22c on the housing 1. The user operating portion 32b1 and the button pressing portion 32b2 are connected by a connecting portion 32b3.

As illustrated in FIGS. 12A and 12B and FIG. 13, the user interface button 32b has a pivoting center 32b4 and is held in the cartridge door 30 so as to be pivotable about a pivot shaft 30b formed on the cartridge door 30. When the user operating portion 32b1 is pressed in the direction indicated by arrow F, the user interface button 32b pivots in a counter-clockwise direction about the pivoting center 32b4 and the button pressing portion 32b2 presses the button member 22c. As a result, the switch 22f is turned on, and a user's operation is executed by the image forming apparatus S.

As illustrated in FIG. 13, a stopper 30c for restricting pivoting of the user interface button 32b is formed at a position corresponding to a distal end 32b 5 of the user interface button 32b of the cartridge door 30. By doing so, even when the cartridge door 30 is in an open state, the user interface button 32b is held at the position illustrated in FIG. 11 without being removed from the cartridge door 30. In Embodiment 2, although the user interface button 32b is configured to pivot, a guide may be provided in the cartridge door 30 so that the cartridge door 30 is held so as to be slidable in the up-down direction of the image forming apparatus S.

As described above, by using a highly rigid plastic member for the user interface portion 32j, it is possible to provide an operation panel unit compatible with design of a higher degree of freedom. The design of a higher degree of freedom means such a design that the user interface portion 32j and the switch portion 22k of the operation panel unit are disposed to be completely shifted from each other. Alternatively, the design means such a design that a pressing region of the user interface portion 32j and the position of the button portion of the switch portion 22k (more specifically, the position of the switch portion pressed by the button portion of the switch portion 22k) are disposed so as not to overlap each other.

In the present embodiment, it is possible to provide an image forming apparatus having the cartridge door 30 having a more integrated design in which the gap 25 is not formed between the sheet member and the cartridge door which occurs in Embodiment 1.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-010092, filed on Jan. 24, 2018, and No. 2019-002946, filed on Jan. 10, 2019, which are hereby incorporated by reference herein in their entirety.

What is claimed is:

1. An image forming apparatus comprising:
an apparatus body having a cartridge accommodation portion capable of accommodating a cartridge used for forming an image;
an opening/closing member attached to the apparatus body and being movable between a first position at which the cartridge accommodation portion is exposed to the outside of the image forming apparatus and a second position at which the opening/closing member covers the cartridge accommodation portion; and
an operation panel unit for operating the image forming apparatus, the operation panel unit including:
a sheet portion; and
a switch portion having a switch substrate that transmits a user's operation via the sheet portion to the image forming apparatus,
wherein the sheet portion is provided in the opening/closing member,
wherein the switch portion is provided in the apparatus body, and
wherein, in a state in which the opening/closing member is at the second position, the sheet portion is at such a position as to at least partially overlap the cartridge accommodation portion as viewed in an insertion/removal direction of the cartridge and cover the switch portion.

2. The image forming apparatus according to claim 1, wherein the sheet portion has a display portion that displays functions of the switch portion and is disposed at a position adjacent to a portion that covers the switch portion.

3. The image forming apparatus according to claim 2, wherein, when viewed in a direction in which the switch portion is pressed, the display portion that displays the functions of the switch portion is disposed so as to overlap the cartridge accommodation portion in a state in which the opening/closing member is at the second position.

4. The image forming apparatus according to claim 1, wherein the opening/closing member has a display portion that displays functions of the switch portion and is disposed at a position adjacent to a portion that covers the switch portion.

5. The image forming apparatus according to claim 1, wherein the switch portion includes:
a button portion pressed with the sheet portion disposed in between; and
a switch unit pressed by the button portion, and
wherein, in a direction in which the button portion is pressed, a pressing region of the sheet portion and a position of the switch unit pressed by the button portion are disposed so as not to overlap each other.

6. The image forming apparatus according to claim 1, wherein the sheet portion is attached so as to cover an opening formed in the opening/closing member.

7. The image forming apparatus according to claim 1, wherein an area of the sheet portion is larger than an area of the switch portion when the sheet portion is projected in a direction in which the switch portion is pressed.

8. An image forming apparatus comprising:
an apparatus body having a cartridge accommodation portion capable of accommodating a cartridge used for forming an image;
an opening/closing member attached to the apparatus body and being movable between a first position at which the cartridge accommodation portion is exposed to the outside of the image forming apparatus and a second position at which the opening/closing member covers the cartridge accommodation portion; and
an operation panel unit for operating the image forming apparatus, the operation panel unit including:
a user interface portion operated by a user; and
a switch portion having a switch substrate that transmits a user's operation via the user interface portion to the image forming apparatus,
wherein the user interface portion is provided in the opening/closing member,
wherein the switch portion is provided in the apparatus body, and
wherein, in a state in which the opening/closing member is at the second position, the user interface portion is at such a position as to at least partially overlap the cartridge accommodation portion as viewed in an insertion/removal direction of the cartridge and cover the switch portion.

9. The image forming apparatus according to claim 8, wherein the user interface portion has a display portion that displays functions of the switch portion and is disposed at a position adjacent to a portion that covers the switch portion.

10. The image forming apparatus according to claim 8, wherein the opening/closing member has a display portion that displays functions of the switch portion and is disposed at a position adjacent to a portion that covers the switch portion.

11. The image forming apparatus according to claim 8, wherein the switch portion includes:
a button portion pressed with the user interface portion disposed in between; and
a switch unit pressed by the button portion, and
wherein, in a direction in which the button portion is pressed, a pressing region of the user interface portion and a position of the switch unit pressed by the button portion are disposed so as not to overlap each other.

12. The image forming apparatus according to claim 8, wherein the user interface portion is attached so as to cover an opening formed in the opening/closing member.

13. The image forming apparatus according to claim 8, wherein an area of the user interface portion is larger than an area of the switch portion when the user interface portion is projected in a direction in which the switch portion is pressed.

14. The image forming apparatus according to claim 13, wherein the user interface portion extends from an upper side of the switch portion toward a side on which the cartridge accommodation portion provided adjacently to the switch portion is disposed.

15. The image forming apparatus according to claim 8, wherein the user interface portion is formed of a flexible sheet member.

16. The image forming apparatus according to claim 8, wherein the user interface portion is formed of a rigid member and is held so as to be pivotable with respect to the opening/closing member.

17. The image forming apparatus according to claim 8, wherein the user interface portion is formed of a rigid member and is held so as to be slidable with respect to the opening/closing member along a direction in which the switch portion is pressed.

18. The image forming apparatus according to claim 8, wherein, when viewed in a direction in which the switch portion is pressed, a display portion that displays functions of the switch portion is disposed so as to overlap the cartridge accommodation portion in a state in which the opening/closing member is at the second position.

19. The image forming apparatus according to claim 8, wherein the cartridge is a process cartridge, a drum cartridge, a developing cartridge, or a toner cartridge.

20. An image forming apparatus comprising:
an apparatus body having a guide for guiding a cartridge used for forming an image to an inner side of the apparatus body in order to accommodate the cartridge;
an opening/closing member attached to the apparatus body and being movable between a first position at which the inner side of the apparatus body is exposed to the outside and a second position at which the opening/closing member covers the inner side of the apparatus body; and
an operation panel unit for operating the image forming apparatus, the operation panel unit including:
a user interface portion operated by a user; and
a switch portion having a switch substrate that transmits a user's operation via the user interface portion to the image forming apparatus,
wherein the user interface portion is provided in the opening/closing member,
wherein the switch portion is provided in the apparatus body, and
wherein, when viewed in a direction of pressing the switch portion in a state in which the opening/closing member is at the second position, the user interface portion is at such a position as to at least partially overlap the guide and cover the switch portion.

* * * * *